United States Patent
Parshall

(10) Patent No.: US 9,446,655 B2
(45) Date of Patent: Sep. 20, 2016

(54) POWER OPERATED TRUCK COVER

(71) Applicant: Paul L. Parshall, Naples, FL (US)

(72) Inventor: Paul L. Parshall, Naples, FL (US)

( * ) Notice: Subject to any disclaimer, the term of this patent is extended or adjusted under 35 U.S.C. 154(b) by 2 days.

(21) Appl. No.: 13/999,990

(22) Filed: Apr. 14, 2014

(65) Prior Publication Data

US 2015/0291077 A1 Oct. 15, 2015

(51) Int. Cl.
*B60P 7/02* (2006.01)
*B60J 7/04* (2006.01)

(52) U.S. Cl.
CPC . *B60J 7/041* (2013.01); *B60P 7/02* (2013.01)

(58) Field of Classification Search
CPC .................................. B60P 7/02; B60J 7/041
USPC ............. 296/100.05, 169, 171, 100.4, 100.5, 296/100.12
See application file for complete search history.

(56) References Cited

U.S. PATENT DOCUMENTS

| | | | | |
|---|---|---|---|---|
| 4,874,196 A * | 10/1989 | Goldstein | ................. | B60P 7/04 160/71 |
| 5,058,956 A * | 10/1991 | Godwin, Sr. | ............... | 298/23 C |
| 6,951,363 B2 * | 10/2005 | Hoffman | ................... | 296/100.1 |
| 7,946,643 B2 * | 5/2011 | Getschel et al. | ........... | 296/100.1 |

* cited by examiner

*Primary Examiner* — Joseph D Pape
*Assistant Examiner* — Dana Ivey
(74) *Attorney, Agent, or Firm* — Williams Intellectual Property; Benjamin F. Williams

(57) ABSTRACT

The invention is directed to a pick-up truck having a movable cover thereon. The side wall of the cover having rails at the bottom to accommodate a sliding motion. A hydraulic system is incorporated in the bed of the pick-up truck. The hydraulic system consists of a first hydraulic cylinder being mounted at a top of one of the sidewalls and covering half of the distance of the bed of the truck. A piston of the cylinder is separably connected to a rail on one side of the cover. The piston, when actuated, will move the cover half way along the cover. A second cylinder is mounted at a half way mark of the first cylinder but on the opposite side of the other side wall of the truck. The piston of the second cylinder, when activated, will move the cover to its end position at the tailgate of the pick-up truck.

6 Claims, 2 Drawing Sheets

POWER OPERATED TRUCK COVER

BACKGROUND OF THE INVENTION

This is an improvement of U.S. Pat. No. 4,944,550. This patent discloses a complicated actuation system that is designed to move the enclosure or cover over the bed of the pick-up truck. This is a permanent installation and may interfere with the loading operation of the vehicle. The present invention is designed to hydraulicaly operate the cover which at the same time can be removed. A hand operated truck cover is found in U.S. Pat. Nos. 4,693,508 and 3,773,380 which can be slidingly operated by hand. It has been found that certain persons cannot manipulate the somewhat heavy cover such as elderly persons or persons having some disability. The aim of this invention is to simplify the operation of moving the cover hydraulically.

BRIEF DESCRIPTION OF THE INVENTION

The present invention takes advantage of the slidingly arranged pick-up covers of the patents mentioned above. The basic concept is to mount hydraulic cylinders on each side wall if the truck. The one on one side wall is mounted adjacent the front wall of the pick-up bed and will move the cover half way along its tracks when operated. A second hydraulic cylinder is mounted on the other side pick-up wall or on the opposite side wall. This cylinder is mounted at a position which is half way down or along the wall to take over the final movement of the truck cover if so desired.

DETAILED DESCRIPTION OF THE INVENTION

Figure 1:
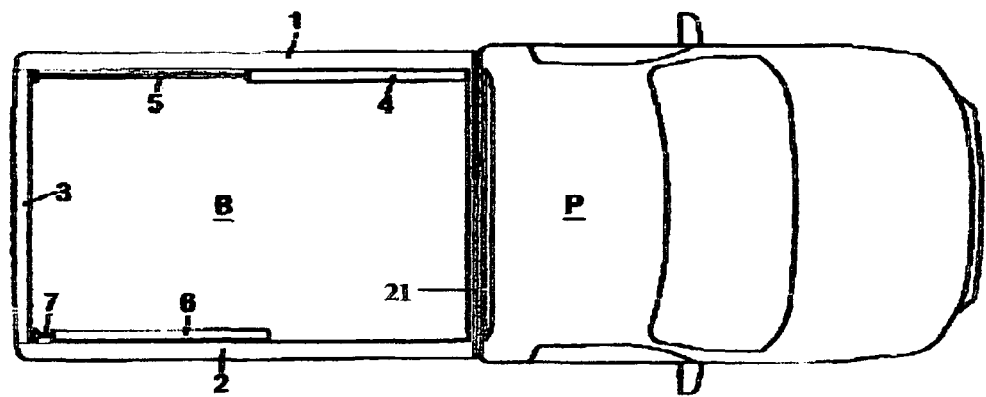
FIG. 1 is a top view of the bed of a Pick-up truck.

FIG. 1 illustrates a top view of the bed of a pick-up truck P and the bed of the pick-up truck B. The left side of the bed B shows the bed side wall 1 and the right side shows the bed B side wall 2. As is well known the side walls are upstanding from the bed of the truck. At the rear of the bed B is located the well known movable gate 3. The side wall 1 has attached thereto, al its top, a hydraulic cylinder 4 having a piston rod 5. This hydraulic cylinder is mounted at the top of the wall adjacent the front wall 21. The other cylinder 6 having the piston rod 7 is mounted to the top of the side wall 2 at a halfway mark between the front and the rear of the bed B. The reason for this placement will be explained below under the heading of "operation".

Figure 2:
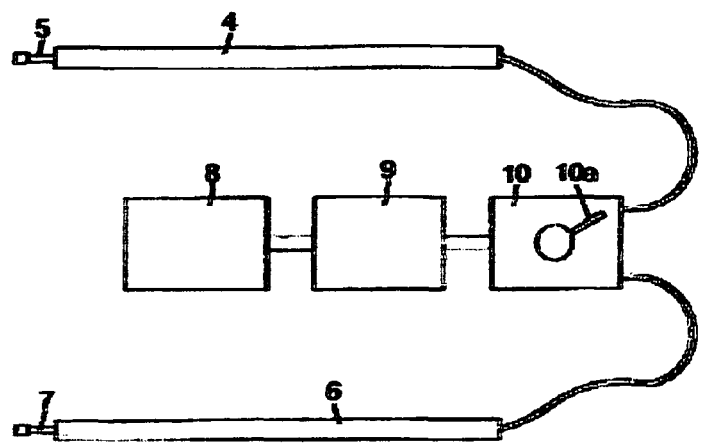
FIG. 2 is diagram of activating the hydraulic system.

Turning now to FIG. 2 which shows the hydraulic switching sytem. At 8 is shown an electric motor which powers a hydraulic pump 9 together with a hydraulic container which contains the pressurized hydraulic fluid. The pressurized hydraulic fluid can be directed to either the hydraulic cylinder 4 or to the hydraulic cylinder 6 by way of the switching device 10 by way of the lever 10a. From the switching device 10 the hydraulic fluid can be applied to hydraulic cylinder 4 or to the hydraulic cylinder 6. This depends on the adjusted location of the truck cover, which will be further explained below. The switching device can be located inside the truck cab on the rear top of the passenger seat. This makes it easy to operate.

Figure 3:
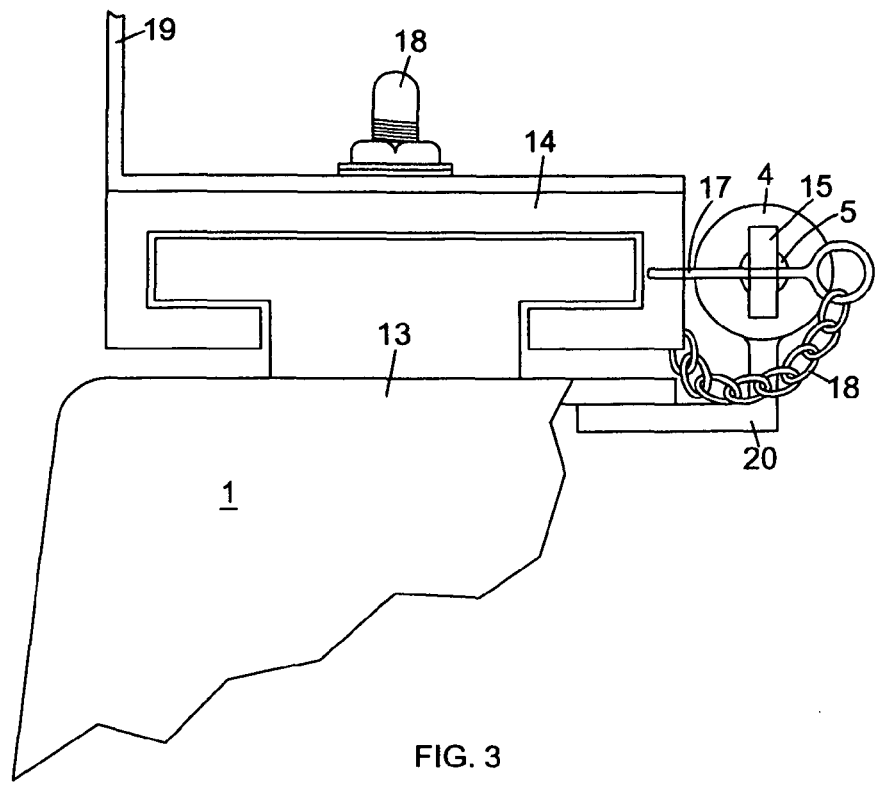
FIG. 3 a crossectional view of the cover slide channels and the connection of the hydraulic piston.

FIG. 3 shows a rear view of the sliding rail system of the cover 19 on the upper edge of the pick-up truck 1. The sliding system consists of a T-shape profile rail 13 which is mounted on the top edge of the sidewall. The T-shaped rail part 13 is surrounded by a U-shaped rail 14 which is mounted to the bottom edge of the pick-up cover 19. To activate a sliding movement of the pick-up cover relative to bed B of the truck, the cylinder 4 is mounted at the top edge of the side wall by way of the L-shaped connecting plate 20. The piston rod 5 has been provided with an eyelet type connection 15 at its forward end. A removable pin 17 passes through the eyelet 15 into the U-shaped sliding rail 14 to thereby connect the hydraulic cylinder with the pick-up cover 14 and causes a movement relative to the bed of the truck when activated by the switching device 10, see FIG. 2. The connecting pin 17 has a loss prevention chain 18 attached thereto.

Figure 4:
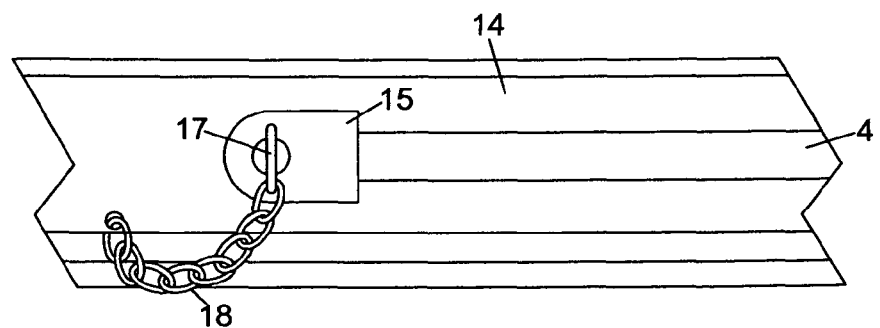
FIG. 4 shows the connection of the hydraulic piston.

FIG. 4 is a side view of the piston rod 4 being attached to the rail member 14. The piston rod 4 shows the eyelet type connection 15 attached to its forward end and also shows the connecting pin 17 making the connection to the rail member 14 of the truck cover. Again, the pin 17 has a loss prevention chain attached thereto.

It is pointed out at this time that both hydraulic cylinders on the left or right hand side at the top of the sidewalls walls 1 and 2 are connected in the same manner as was explained with reference to FIGS. 3 and 4.

Operation

The pick-up truck is in a stand still mode. When it is desired to open the cover, the hand switch 10a is operated to the left, that is, counter-clockwise. By having reference to FIG. 1, the hydraulic cylinder 4 is activated by hydraulic fluid and the piston 5 will extend. Because the piston 5 is connected to the the U-shaped rail 14, FIG. 3, it will move the cover 19 to a half way position when the piston is in in a fully extended mode. If the cover 19 is to be fully extended to its full open position the pin 17 will have to be pulled out of its engagement with U-shaped rail 14 to free the cylinder 4 and thereby the piston 5 from its engagement with the the U-shaped rail 14. Prior to moving the hand switch 10a to the right or clockwise, a connection will be made simply by engaging the eyelet of the front of the piston rod 7 with the U-shaped rail by inserting the pin 17 into its connecting position and the other cylinder 6 will be activated and the piston rod 7 will extend from the cylinder 6 under the hydraulic pressure and extend the cover 19 to its fully extended position.

What I claim is:
1. A system for moving a pick-up cover located over a bed of a pick-up truck having a forward cab-side wall location, a reargate location, a left side wall extending lengthwise between said forward cab side wall location and said reargate location and a right side wall extending lengthwise between said forward cab side wall location and said reargate location, comprising:
a plurality of hydraulic cylinders defining at least a first hydraulic cylinder mounted on and coplanar with a top of said right side wall, adjacent with said forward cab side wall location and a second hydraulic cylinder mounted on and coplanar with a top of said left side wall and positioned half way between said forward cab side wall location and said reargate location;

a first piston rod associated integral with said first cylinder and selectively connectable to said pick-up cover, said first piston rod extensible from within from said first hydraulic cylinder, thereby causing said pick-up cover to move lengthwise along the right side wall and left side wall from a closed position to a partially opened position; and a second piston rod associated with said second hydraulic cylinder and selectively connectable to said pick-up cover, said second piston rod configured to selectively extend from said second hydraulic cylinder, thereby causing said pick-up cover to move further lengthwise along the right side wall and left side wall to an open position.

2. The system of claim 1, additionally comprising:

a first pin operative to removably engage the first piston rod and said pick-up cover, thereby selectively connecting first piston rod and said pick-up cover; and a second pin operative to removably engage the second piston rod and said pick-up cover, thereby selectively connecting second piston rod and said pick-up cover.

3. The system of claim 2, said first pin and said second pin each have a loss prevention chain attached thereto.

4. The system of claim 1, additionally comprising a hydraulic switching system operative at any given moment to either supply pressurized hydraulic fluid to the first cylinder, thereby causing the first piston rod to extend, or to the second cylinder, thereby causing the second piston rod to extend.

5. The system of claim 4, wherein said hydraulic switching system includes an electric motor operative to drive a fluid pressure pump which supplies pressurized hydraulic fluid to either the first cylinder or second cylinder.

6. The system of claim 5, wherein said hydraulic switching system additionally includes a switching device having an operating actuator adapted to provide a manual interface that selects whether pressurized fluid is supplied to the first cylinder or second cylinder.

* * * * *